United States Patent
Lin et al.

(10) Patent No.: US 7,180,506 B2
(45) Date of Patent: Feb. 20, 2007

(54) METHOD FOR IDENTIFYING A MOVEMENT OF SINGLE TAP ON A TOUCH DEVICE

(75) Inventors: Jao-Ching Lin, Hsin Chuang (TW); Shyh-In Huang, Hsin Chuang (TW); Lin-Abel Chu, Hsin Chuang (TW); Chung-Yi Shen, Hsin Chuang (TW)

(73) Assignee: Sentelic Corporation, Taipei (TW)

( * ) Notice: Subject to any disclaimer, the term of this patent is extended or adjusted under 35 U.S.C. 154(b) by 554 days.

(21) Appl. No.: 10/776,691

(22) Filed: Feb. 12, 2004

(65) Prior Publication Data

US 2005/0179645 A1   Aug. 18, 2005

(51) Int. Cl.
G09G 5/00   (2006.01)
(52) U.S. Cl. ........................ 345/173; 345/174
(58) Field of Classification Search ................ 345/156, 345/157, 173–177; 178/18.01–18.09
See application file for complete search history.

(56) References Cited

U.S. PATENT DOCUMENTS

| 5,854,450 | A   | * | 12/1998 | Kent ........................ 178/18.04 |
| 5,943,043 | A   | * | 8/1999  | Furuhata et al. ............. 345/173 |
| 6,037,882 | A   | * | 3/2000  | Levy ............................ 341/20 |
| 6,337,678 | B1  | * | 1/2002  | Fish ............................ 345/156 |
| 6,504,530 | B1  | * | 1/2003  | Wilson et al. ............... 345/173 |
| 6,995,752 | B2  | * | 2/2006  | Lu ............................... 345/174 |
| 2003/0063073 | A1 | * | 4/2003 | Geaghan et al. ............ 345/173 |

* cited by examiner

Primary Examiner—Ricardo Osorio

(57) ABSTRACT

A method for identifying a movement of single tap includes having detected the movement of the object contacting the touch device initiating to start time counting, having detected the movement of the object contacting the touch device terminating and a first time span being obtained and generating a control signal indicating the movement of single tap in case of the first time span being less than a second time span, the first time span being greater than a preset time span and only one contacting time being greater than the preset time with the second time span.

4 Claims, 5 Drawing Sheets

METHOD FOR IDENTIFYING A MOVEMENT OF SINGLE TAP ON A TOUCH DEVICE

BACKGROUND OF THE INVENTION

1. Field of Invention

The present invention is related to a method for identifying a movement of single tap on a touch device, particularly to an identifying method capable of resisting noise effectively and enhancing identification rate and a controller utilizing the method.

2. Brief Description of Related Art

The touch pad is a humanized input device in spite of the conventional input devices such as keyboard, mouse and locus ball being unable to satisfy need of the user. Further, a trend of designing electronic products is to pursue lightness, thinness, shortness and smallness so that it is not possible to integrate all kinds of input devices in a single electronic product. Because the touch pad can provide the user a humanized operation with handwriting input and has the function of the conventional input devices at the same time, the touch pad has become the most popular choice.

Referring to FIG. 1, the touch pad 10 can access analog/digital conversion and figure out coordinates of the touch point with a controller 20 after producing analog signals of voltage. Meanwhile, the controller 20 can identify if the user produce a single tap or click, double taps or clicks, a drag or a movement and then sends related control signal to a main unit 30 to control the cursor on a screen 40 of the main unit 30 accessing movements of shifting, selecting an item and executing a program.

The analog/digital converter (not shown) in the controller 20 can be interfered by foreign noise such as electromagnetic wave easily so that it is necessary to add proper samples and recognition algorithm in addition to requiring careful layout of internal circuit and increasing various filters for solving the problem. Otherwise, the noise is easy to result in phenomenon of temporary pseudo press or pseudo exit such that the controller 20 erroneously determines the movement.

U.S. Pat. No. 6,380,931 discloses an identifying method of single tap with a touch device and a brief summary thereof is described hereinafter. Referring FIG. 2, firstly, it is to detect if an object such as touch pen contacts the touch device as shown in step 201 and then it is to compare time T of the object with a default value Tmax and check if T is smaller than Tmax as shown in step 202. Further, it is to make sure if displacement S of the object on the touch device is smaller than a default value Smax as shown in step 203. In case of meeting the preceding two conditions, determination of single tap movement can be made and a control signal of representing the single tap and information regarding coordinates of position at the spot of clicking can be sent to the main unit. However, the preceding method is not possible to resist noise, which is apt to produce phenomenon of pseudo press. Especially in order to comply with calculation of the two restrictions (contact time and displacement), the set up cost of the logic circuit is expensive too.

SUMMARY OF THE INVENTION

Accordingly, an object of the present invention is to provide a method, which can filter unnecessary noise effectively for enhancing accuracy of identifying a movement of single tap, and a controller thereof.

Wherein, the controller, which sends at least a control signal to a main unit corresponding to a movement of at least an object contacting the touch device, comprises a coordinate calculating unit, a detecting contact unit, a counting time unit, an operation unit and an encoding unit.

The coordinate calculating unit detects an electronic signal sent by the touch device to figure out a coordinate position of the object contacting the touch device.

The detecting contact unit detects the electronic signal sent by the touch device to determine if the object contacts the touch device.

The operation unit figures out a first time span of the object contacting the touch device during the object terminating contacting the touch device according to a result of the determination done by the detecting contact unit, controls the counting time unit to start time counting in case of the object contacts the touch device and generates a control signal indicating the single tap in case of the first time span being less than a second time span, the first time span being greater than a preset time span and only one contacting time being greater than the preset time in the second time span.

The encoding unit encodes the control signal and the coordinate position and sending the encoded data to the main unit.

The method for identifying a movement of single tap according to the present invention is to have detected the movement of the object contacting the touch device initiating time counting and have detected the movement of the object contacting the touch device being terminated and a first time span being obtained.

Finally, a control signal indicating the movement of single tap can be obtained in case of the first time span being less than a second time span, the first time span being greater than a preset time span and only one contacting time being greater than the preset time with the second time span.

In short, the present invention provides another restriction regarding if the time span of the object contacting the touch device is greater than the first time span and smaller than the second time span in addition to the restriction regarding if only one contact movement in the second time span. Hence, it is capable of resisting noise effectively to enhance accuracy of recognizing movements. Moreover, due to being not necessary to provide a restriction of displacement, it is possible to lower down the set up cost for logic circuit.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE PREFERRED EMBODIMENT

Figure 1:
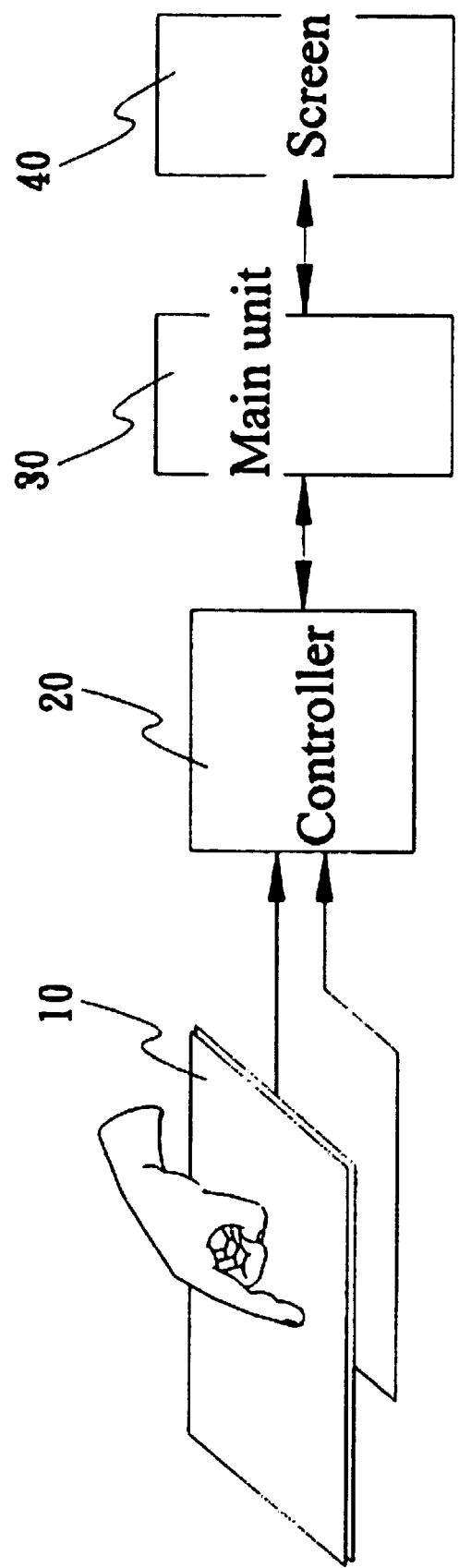
FIG. 1 is a block diagram illustrating relationship between a touch device, a controller and a main unit.
Figure 2:
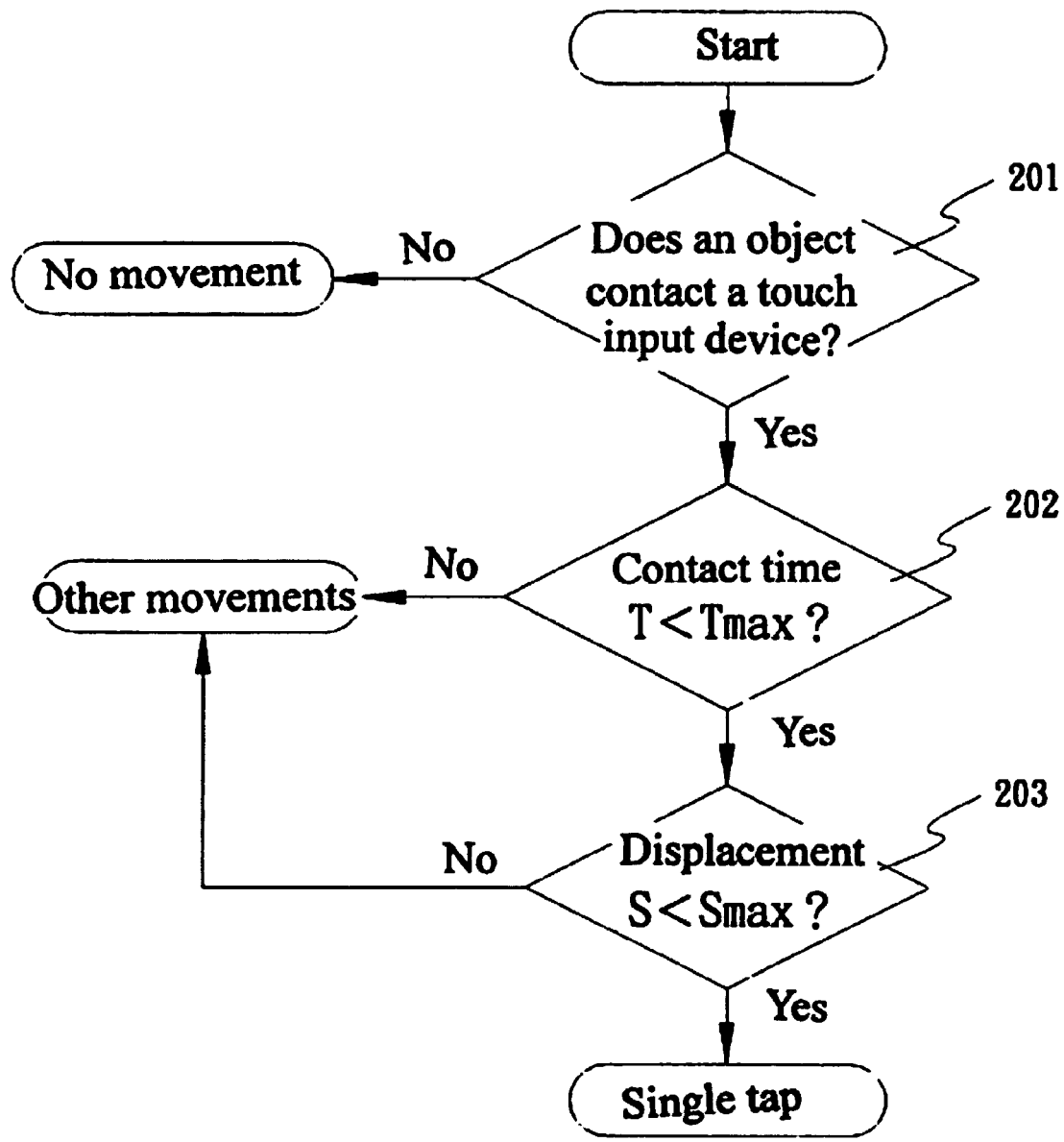
FIG. 2 is a flow chart illustrating steps in a method for identifying the movement of single tap disclosed in U.S. Pat. No. 6,380,931.
Figure 3:
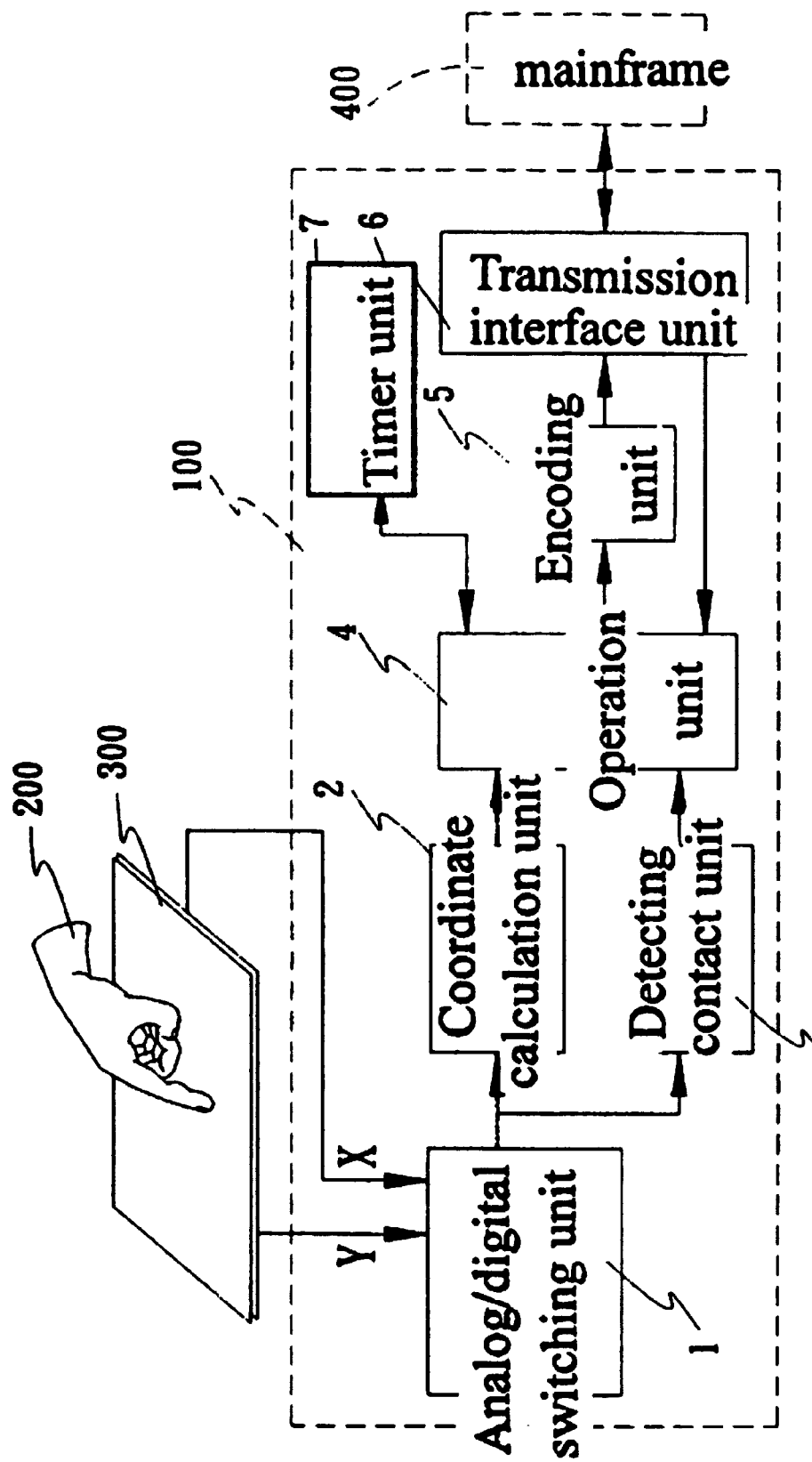
FIG. 3 is a block diagram illustrating a preferred embodiment of a controller in the touch device of the present invention.

Referring to FIG. 3, the controller 100 of a touch device 300 is used for identifying a movement of an object 200 on the touch device 300 and sending a control signal corresponding the movement to a main unit 400. It is noted that the touch device 300 can be a capacitance type, inductance type and the like. The capacitance type of touch device 300 is specifically used for the embodiment.

The object 200 is utilized to contact with the touch device 300, that is, the movement of the object 200 on the touch device 300 results in the controller 100 sending a control signal, which corresponds to the movement, to the main unit 400. Generally, the control signal can be coordinates change, a tap, double taps, a drag, a movement, scrolling, a left key, a right key, a middle key and etc. to simulate behaviors of a mouse and a keyboard further.

The main unit 400 can be various electronic devices such as a desktop computer, a note book computer, a personal digital assistant (PDA), a cellular phone, a remote controller for different electric appliances or any other input device for the electronic devices.

A preferred embodiment of the controller 100 includes a analog/digital switching unit 1, a coordinate calculating unit 2, a detecting contact unit 3, an operation unit 4, an encoding unit 5, a transmission interface unit 6 and a timer unit 7.

Because the touch device 300 distributes multiple lead wires in X and Y directions respectively, the touch device 300 will occur a change of capacitance value as soon as the object 200 contacts the touch device 300. Thus, values such as coordinates can be figured out by way of measuring variations of voltages.

The analog/digital switching unit 1 is connected to the touch device 300 to convert different voltages into corresponding digital signals for subsequent process. The coordinate calculation unit 2 decodes the digital signal sent from the analog/digital switching unit 1 as corresponding absolute coordinate values (X, Y).

The detecting contact unit 3 is capable of detecting if the touch device 300 is pressed with an object and figuring out time duration of the object 200 contacting the touch device 300. The time duration is a parameter for judging which one of the movements, a tap, double tap or drag.

The operation unit 4 is connected to the coordinate calculation unit 2 and the detecting contact unit 3. The operation unit 4 is built in a logic calculation method, which can determine if a movement operated by the user meets a condition of a tap, double taps or drag. The present invention emphasizes determination of single tap and a detail explanation about the determination of single tap will be description hereinafter.

The operation unit 4 is capable of offering relative displacement except determination of movement, that is, after multiple pairs of absolute coordinate values being transmitted to the operation unit 4 sequentially, the operation unit 4 can figure out a relative displacement of the object 200 on the touch device 300 and even parameters such as velocity, direction and distance of the object 200 according to the difference between two neighboring coordinates. As for whether sending the absolute coordinates or the relative displacement to the main unit 400, it depends on application requirement of the main unit 400.

The encoding unit 5 connects with the operation unit 4 so that it is possible for the encoding unit 5 to receive absolute coordinate signal, relative displacement signal or touch signals, which include single tap, double tap and drag. The encoding unit 5 can encode different signals as hand-write input protocol or standard mouse protocol such as mouse standard protocol of Microsoft company or PS/2 mouse standard protocol of IBM company available for operation system of the main unit 400.

The transmission interface unit 6 provides a function of sending the encoded signal done by the encoding unit 5 to the main unit 400 in series. Taking a desktop computer as an example, the encoded signal is sent to a keyboard controller (not shown) or South Bridge chip (not shown) so that it is possible to send an interruption request (IRQ) to the processor of the main unit 400. As a result, the main unit 400 can further obtain required parameters such as coordinate location and execution movement and movements such as displacement of the cursor, program selection or program execution can be performed further.

Figure 4:
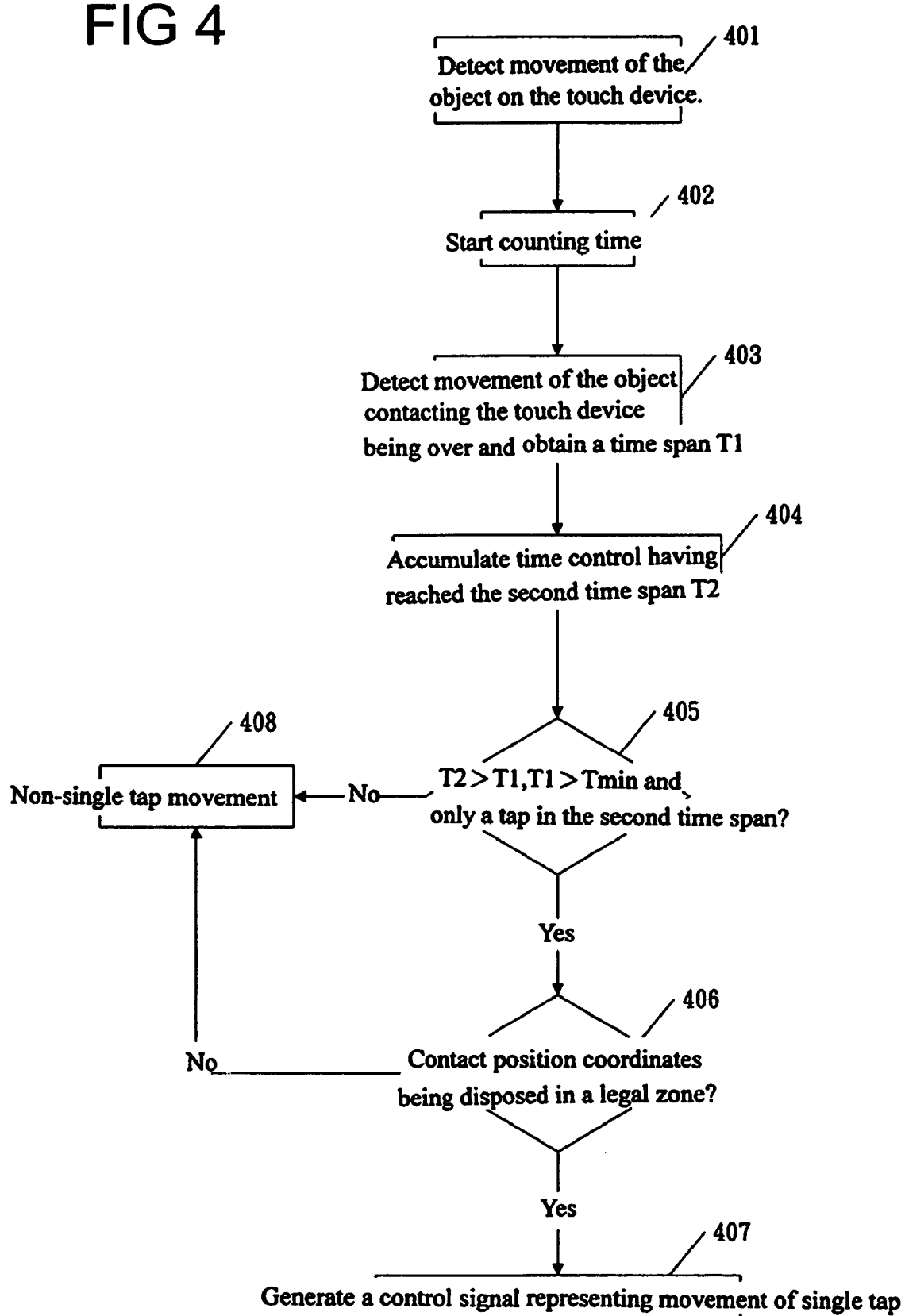
FIG. 4 is a flow chart illustrating steps in a method for identifying the movement of single tap according to the present invention.
Figure 5:
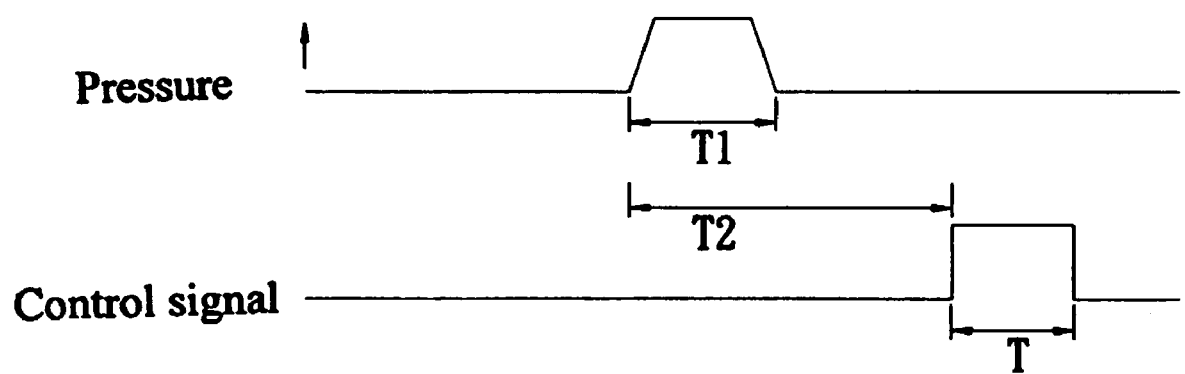
FIG. 5 a graph of time sequence illustrating control signals being produced corresponding to the movement of correct single tap according to the present invention.

Referring to FIGS. 4 and 5, the identifying method of single tap movement according to the present invention at the very first as steps 401, 402 illustrated is utilizing the detecting contact unit 3 to detect the movement of the object 200 on the touch device 300. A positive edge of T1 time span wave (temporary state while lower level position changes to high level position) indicates a movement of contact occurring and the operation unit 4 controls the timer unit 7 to begin counting the time.

Next, as indicated in step 403, once the object 200 detaches from the touch device 300 after contacting the touch device 300 a time duration T1 (first time span), the detecting contact unit 3 will detect the movement of contacting the touch device 300 being over. It is a negative edge of the wave shape shown in FIG. 5.

Then, step 404 shows that the timer unit 7 terminates counting the time after the time lapsing a second time span T2 from starting counting the time.

Step 405 shows that the operation unit 4 determines if the condition of only one contact time duration being greater than a preset time span $T_{min}$ of the tap movement except T1 being smaller than the second time span T2 and greater than a preset time span $T_{min}$ is fulfilled. If the condition is not fulfilled, the process is moved to step 408 and the operation unit 4 can have judgment of other movements in case of the original judgment being not the movement of single tap. If the condition is fulfilled, step 406 is processed.

In order to determine the movement of single tap more accurately, a legal zone (not shown) for the movement of single tap is defined and judgment for position coordinates (X,Y) of the object 200 contacting the touch device 300 being within the legal zone ($X_1 \sim X_2, Y_1 \sim Y_2; X_1 < X_2, Y_1 < Y_2$). If the determination in step 406 is 'YES' ($X_1 \leq X \leq X_2$, $Y_1 \leq Y \leq Y_2$), it means the movement is single tap definitely and step 407 is executed to produce a control signal representing the movement of single tap as shown in lower part of FIG. 5 being sent to the main unit 400 via the encoding unit 5 and the transmission interface unit 6. If the determination in step 406 is 'NO', it means the movement is not single tap and the process is moved to step 408.

In short, in order to obtain the movement of single tap, following conditions have to be met:
(1) T2>T1
(2) $T_{min}$<T1
(3) Only one contact time duration is greater than the preset time span $T_{min}$ for the movement of tap.
(4) $X_1 \leq X \leq X_2; Y_1 \leq Y \leq Y_2$ It is appreciated that the method and device according to the present invention can resist noise effectively and enhance accuracy of identifying the movement in case of time being counted from the object 200 being started to contact with the touch device 300, a determination of single tap movement being performed within the second time span T2, the first time span T1 being greater than the preset time span Tmin and smaller than the second time span T2 and the contact position coordinates (X,Y) of the object 200 on the touch device 300 being in the legal zone of single tap. Further, internal logic circuit of the controller 300 can be simplified to lower the installation cost and reduce power consumption.

While the invention has been described with referencing to a preferred embodiment thereof, it is to be understood that modifications or variations may be easily made without departing from the spirit of this invention, which is defined by the appended claims.

What is claimed is:

1. A method for identifying a movement of single tap, which is a movement done with at least an object contacting a touch device, comprising following steps:
    (A) having detected the movement of the object contacting the touch device initiating with starting time counting;
    (B) having detected the movement of the object contacting the touch device terminating and a first time span being obtained; and
    (C) generating a control signal indicating the movement of single tap in case of the first time span being less than a second time span, the first time span being greater than a preset time span and only one contacting time being greater than the preset time with the second time span.

2. The method for identifying a movement of single tap as defined in claim 1, wherein the step C further determines contact position coordinates of the object contacting with the touch device are in a legal zone for single tap before the control signal of single tap movement.

3. A controller of a touch device, which sends at least a control signal to a main unit corresponding to a movement of at least an object contacting the touch device, comprising:
    a coordinate calculating unit, detecting an electronic signal sent by the touch device to figure out a coordinate position of the object contacting the touch device;
    a detecting contact unit, detecting the electronic signal sent by the touch device to determine if the object contacts the touch device;
    a counting time unit, counting time during the object contacting the touch device;
    an operation unit, figuring out a first time span of the object contacting the touch device during the object terminating contacting the touch device according to a result of the determination done by the detecting contact unit, controlling the counting time unit to start time counting in case of the object contacts the touch device and generating a control signal indicating the single tap in case of the first time span being less than a second time span, the first time span being greater than a preset time span and only one contacting time being greater than the preset time in the second time span; and
    an encoding unit, encoding the control signal and the coordinate position and sending the encoded data to the main unit.

4. The controller as defined in claim 3, wherein the operation unit generates the control signal after the operation unit having determined the coordinate position of the object contacting the touch device being within a legal position of single movement.

* * * * *